(12) United States Patent
Imai et al.

(10) Patent No.: US 11,051,370 B2
(45) Date of Patent: Jun. 29, 2021

(54) DEVICE FOR COOKING BY HEATING AND CONTROL METHOD FOR SAME

(71) Applicant: Panasonic Intellectual Property Management Co., Ltd., Osaka (JP)

(72) Inventors: Hirohisa Imai, Shiga (JP); Koichiro Yamashita, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 333 days.

(21) Appl. No.: 15/511,044

(22) PCT Filed: Oct. 6, 2015

(86) PCT No.: PCT/JP2015/005072
§ 371 (c)(1),
(2) Date: Mar. 14, 2017

(87) PCT Pub. No.: WO2016/059770
PCT Pub. Date: Apr. 21, 2016

(65) Prior Publication Data
US 2017/0280515 A1 Sep. 28, 2017

(30) Foreign Application Priority Data
Oct. 17, 2014 (JP) .............................. JP2014-212469

(51) Int. Cl.
*H05B 6/64* (2006.01)
*F24C 7/08* (2006.01)
(Continued)

(52) U.S. Cl.
CPC ............. *H05B 6/6435* (2013.01); *F24C 7/02* (2013.01); *F24C 7/08* (2013.01); *F24C 7/085* (2013.01);
(Continued)

(58) Field of Classification Search
USPC .......................................................... 219/702
See application file for complete search history.

(56) References Cited

U.S. PATENT DOCUMENTS

| 2013/0186887 A1* | 7/2013 | Hallgren | ................ | H05B 6/686 |
| | | | | 219/702 |
| 2013/0302483 A1* | 11/2013 | Riefenstein | ............. | F24C 7/085 |
| | | | | 426/233 |

FOREIGN PATENT DOCUMENTS

| EP | 2662628 A1 | 11/2013 |
| JP | 2-122119 | 5/1990 |

(Continued)

OTHER PUBLICATIONS

The Extended European Search Report dated Oct. 4, 2017 for the related European Patent Application No. 15850136.1.
(Continued)

*Primary Examiner* — Dana Ross
*Assistant Examiner* — Joseph W Iskra
(74) *Attorney, Agent, or Firm* — McDermott Will & Emery LLP

(57) ABSTRACT

A device for cooking by heating comprises: a heating unit for heating food that is accommodated in a cooking cavity, a setting unit for setting a heating control content of the heating unit, a display unit for displaying the heating control content set by setting unit, and a display controller for controlling display on the display unit. Moreover, the device for cooking by heating comprises: an image capturing unit for capturing the inside of the cooking cavity, and a storage unit for storing an image captured by image capturing unit and the heating control content set by setting unit in a correspondence table in association with each other. The display controller controls display so as to display images stored in the storage unit in a list on the display unit, and the (Continued)

setting unit sets, based on selection of an image from the list, the associated heating control content in the correspondence table in the storage unit.

8 Claims, 12 Drawing Sheets

(51) Int. Cl.
*F24C 7/02* (2006.01)
*A47J 36/00* (2006.01)

(52) U.S. Cl.
CPC ......... *H05B 6/6438* (2013.01); *H05B 6/6455* (2013.01); *H05B 6/6485* (2013.01); *A47J 36/00* (2013.01)

(56) References Cited

FOREIGN PATENT DOCUMENTS

| | | |
|---|---|---|
| JP | 2005-140418 | 6/2005 |
| JP | 2010-061382 | 3/2010 |
| JP | 2012-241932 | 12/2012 |
| JP | 2013-019554 | 1/2013 |

OTHER PUBLICATIONS

International Search Report of PCT application No. PCT/JP2015/005072 dated Dec. 28, 2015.

* cited by examiner

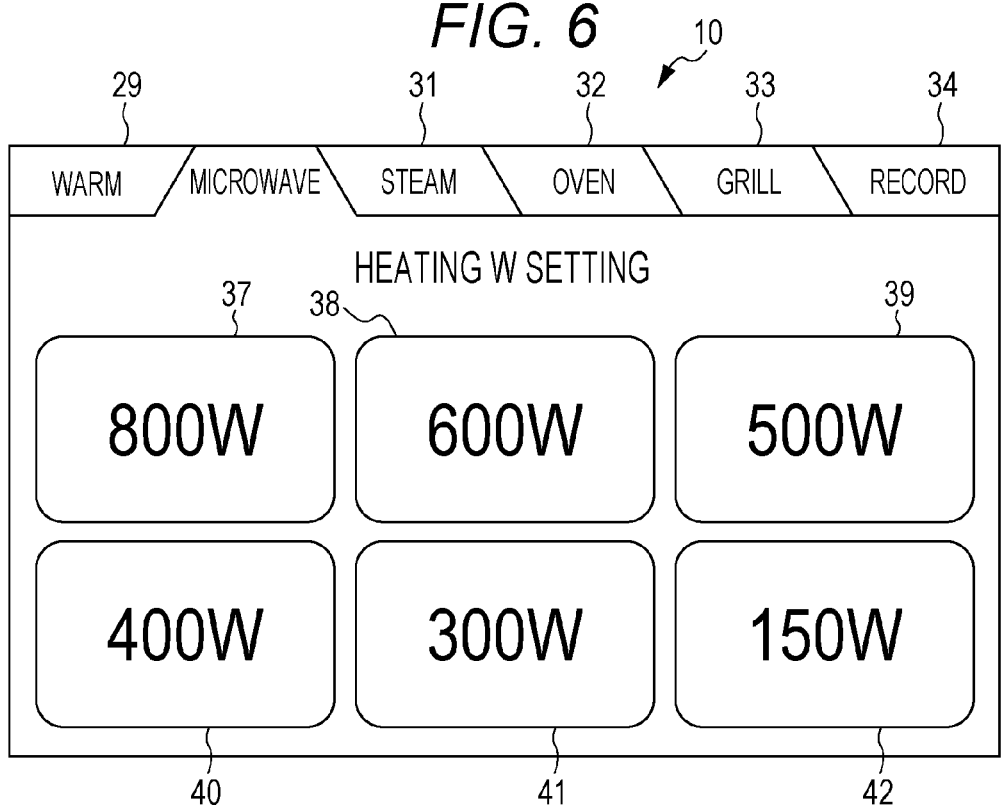
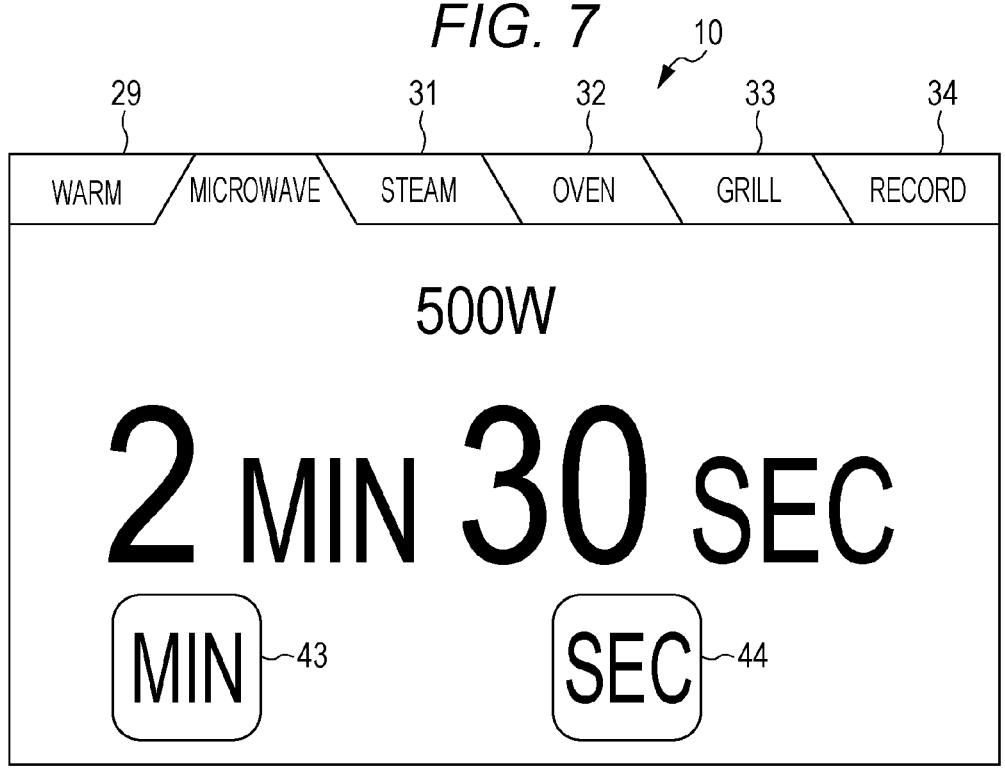

DEVICE FOR COOKING BY HEATING AND CONTROL METHOD FOR SAME

This application is a U.S. national stage application of the PCT International Application No. PCT/JP2015/005072 filed on Oct. 6, 2015, which claims the benefit of foreign priority of Japanese patent application 2014-212469 filed on Oct. 17, 2014, the contents all of which are incorporated herein by reference.

TECHNICAL FIELD

The present invention relates to a device for cooking by heating food.

BACKGROUND ART

A microwave oven, which is a typical device for cooking by heating, includes various heating sources such as an oven, a grill, and a steamer, in addition to heating by microwaves. With this kind of microwave oven, various types of cooking, reheating, and the like become possible by selecting an appropriate heating source among these heating sources to perform heating.

However, setting operation for control contents of the heating sources become complicated, as a result of making the oven compatible with the various types of cooking, reheating, and the like.

To facilitate such operation, there is proposed a device for cooking by heating which allows a record search among heating information used in the past (for example, see PTL 1).

An example of such device is a microwave oven which includes a display unit of liquid crystal display or the like, and a touch panel, and further includes, on an initial screen, a record search button for selecting "recently used menus". A user may select a recently used heating control content by selecting the record search button at the time of searching among a history of records.

That is, when the record search button is selected, heating control contents previously used are displayed chronologically in the order of a heating control content of previous heating, a heating control content of second previous heating, and a heating control content of third previous heating, for example. A user may call up a heating control content of past heating by selecting a heating control content from the heating control contents mentioned above. Thus, at the time of heating with the same heating control content, burdensome setting operation is not required, and heating may be set by a simple operation.

As indicated by the conventional example described above, a heating control content is determined by selecting a menu name such as "steak", "pot stickers", "eggplant with soy-ginger sauce", or "steamed sweet potato". Thus, it is easy to select a menu that is prepared in advance. However, there is a problem that a record search is not easy in the case of heating which requires the heating control content to be set manually.

As some examples of often used heating, a bowl of cold rice is microwave heated for 1 minute at 500 W, a large bowl of cold rice is microwave heated for 2 minutes at 500 W, and cold miso soup is microwave heated for 1 minute and 30 seconds at 500 W. Then, if, as a result of a record search performed before a bowl of cold rice is heated next time, "500 W, 1 min", "500 W, 2 min", and "500 W, 1 min 30 sec" are displayed as heating control contents, a user would be unsure about which one to select.

That is, as the number of menus prepared in advance is limited, a user has to manually set the heating control contents when heating by other menus. In this case, there are only pieces of numerical information, such as wattage and the heating time or the finishing temperature for microwave heating, and the heating temperature and the heating time for oven cooking. Even if these information are displayed, it is not clear what to select. In other words, it is difficult to set a heating content using the record search.

The present invention allows simple and sure selection of a heating control content when heating is performed again using a heating control content that is the same as a heating control content which has been set once and used for heating, to thereby improve the usability of a device for cooking by heating.

CITATION LIST

Patent Literature

PTL 1: Unexamined Japanese Patent Publication No. 2012-241932

SUMMARY OF THE INVENTION

A device for cooking by heating according to the present invention includes a heating unit for heating food that is accommodated in a cooking cavity, a setting unit for setting a heating control content of the heating unit, a display unit for displaying the heating control content set by the setting unit, and a display controller for controlling display on the display unit. There are also included an image capturing unit for capturing the inside of the cooking cavity, and a storage unit for storing the image captured by the image capturing unit and the heating control content set by the setting unit as a correspondence table in association with each other. Furthermore, the display controller controls display so as to display the images stored in the storage unit in a list on the display unit, and the setting unit sets, based on selection of an image from the list, an associated heating control content in the correspondence table in the storage unit.

According to this configuration, a user sets a heating control content of the heating unit by using the setting unit, the storage unit stores, as a correspondence table, the image of the inside of the cooking cavity captured by the image capturing unit and the heating control content set by the setting unit in association with each other, and the display controller performs control so as to display the images stored in the storage unit in a list on the display unit. When the user selects an image from the list, the setting unit sets the heating control content that is associated with the selected image in the correspondence table. Thus, in the case of performing heating with the same heating control content as a setting performed in the past, burdensome setting operation becomes unnecessary. In addition, because the user is allowed to select a heating control content stored in the storage unit by image, heating control content may be surely selected, and the usability is improved.

As described above, according to the present invention, burdensome setting operation becomes unnecessary when a user performs heating with a heating control content which is the same as a setting performed in the past, and also, the user is allowed to select a heating control content stored in the storage unit by image, and a heating control content may be surely selected, and the usability is improved.

BRIEF DESCRIPTION OF DRAWINGS

FIG. 6 is a diagram showing a selection screen of wattage for microwave heating on the liquid crystal touch panel of the device for cooking by heating according to the first exemplary embodiment of the present invention.

FIG. 7 is a diagram showing a microwave heating time setting screen on the liquid crystal touch panel of the device for cooking by heating according to the first exemplary embodiment of the present invention.

DESCRIPTION OF EMBODIMENTS

First Exemplary Embodiment

Figure 1:
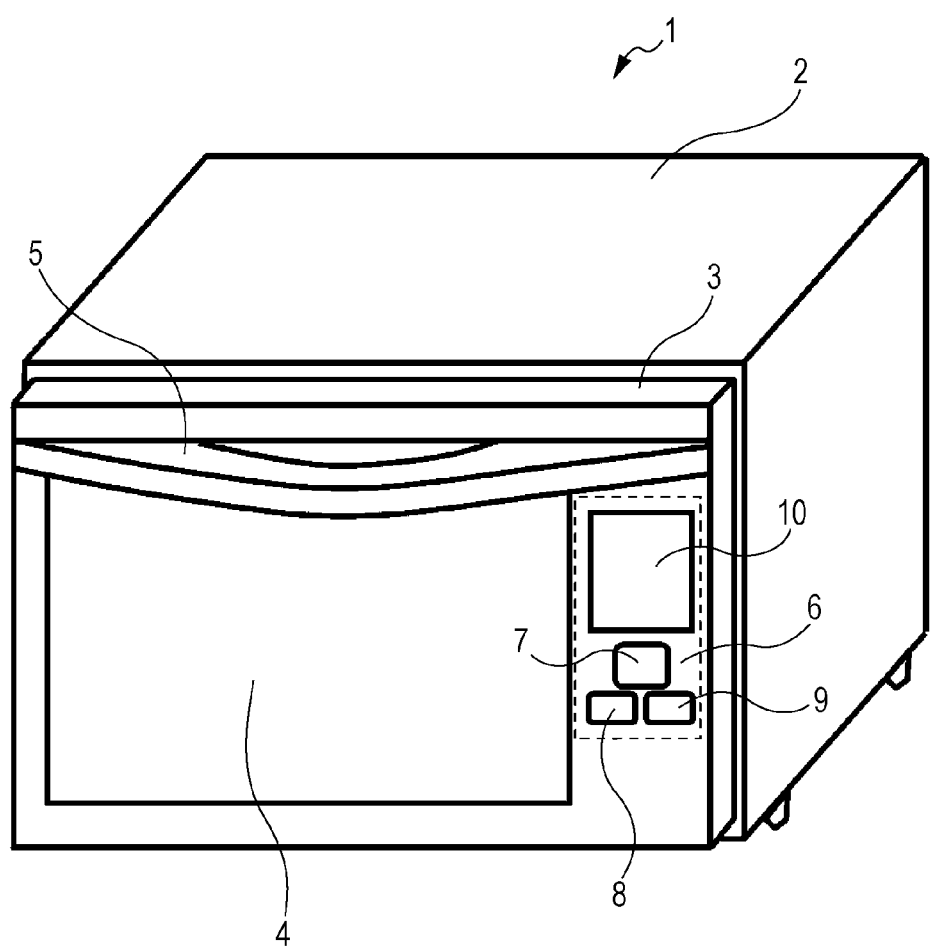
FIG. 1 is an external perspective diagram of a device for cooking by heating according to a first exemplary embodiment of the present invention.

FIG. 1 is an external perspective diagram of microwave oven 1, which is a typical device for cooking by heating according to the present invention. As shown in FIG. 1, microwave oven 1 is provided with door 3 used for placing in or taking out food from housing 2 for accommodating food. Also, door 3 includes transparent glass window 4 allowing the inside of housing 2 to be seen, handle 5 to be grasped at the time of opening/closing door 3, and operation display unit 6.

Operation display unit 6 includes heating start button 7, cancel button 8, return button 9, and liquid crystal touch panel 10 which is both a display unit and a setting unit. Heating start button 7 is pressed to start heating after various settings have been performed at liquid crystal touch panel 10 with respect to heating control content. Cancel button 8 is pressed after heating start button 7 is pressed to start heating, to stop heating during heating, or to cancel operation at liquid crystal touch panel 10. Return button 9 is pressed to return screen display on liquid crystal touch panel 10 to immediately preceding screen display. Furthermore, liquid crystal touch panel 10 is configured by having a touch panel, which is the setting unit, integrally formed on the front surface of color liquid crystal display, which is the display unit.

Figure 2:
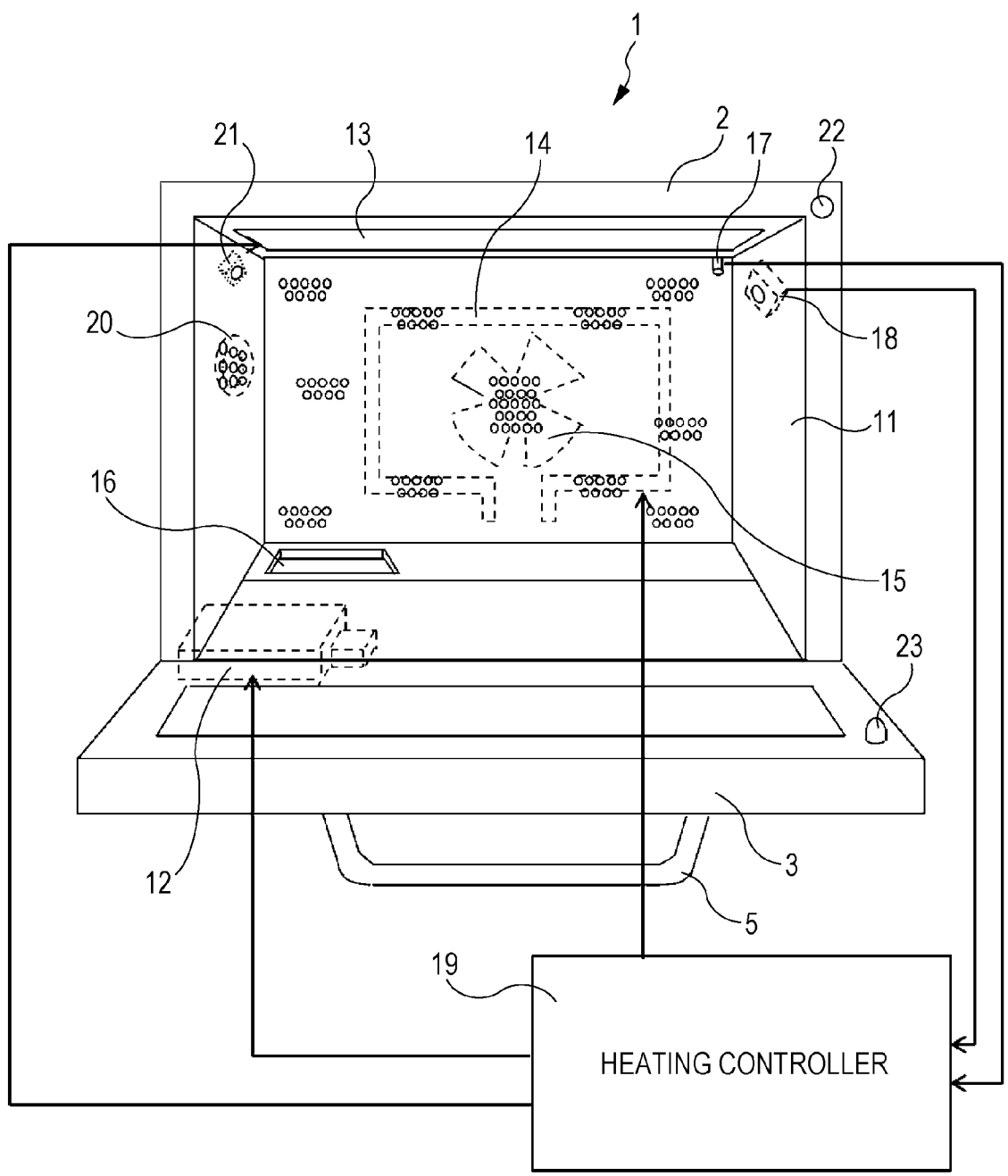
FIG. 2 is a schematic configuration diagram of the device for cooking by heating according to the first exemplary embodiment of the present invention.

FIG. 2 is a schematic configuration diagram of microwave oven 1 according to the present invention. Microwave oven 1 is capable of using high-frequency heating, and heating by thermal radiation, hot blast, and steam to cook food by heating. Microwave oven 1 includes, inside cooking cavity 11 for accommodating food and the like, magnetron 12, which is a heating unit for outputting high-frequency waves, flat heater 13, which is a heating unit for generating thermal radiation, convection heater (sheathed heater) 14 and circulating fan 15, which are a heating unit for sending warm air into cooking cavity 11, and steam generator 16, which is a heating unit for generating steam inside cooking cavity 11. Moreover, microwave oven 1 supplies at least one of high-frequency waves, radiation, hot blast, and steam to cooking cavity 11, and heats food that is accommodated in cooking cavity 11.

Furthermore, thermistor 17 detects the ambient temperature inside cooking cavity 11, and infrared sensor 18 detects a surface temperature of food. Heating controller 19 controls a heating unit, such as magnetron 12, flat heater 13, convection heater 14, steam generator 16 or the like, based on the pieces of detected temperature information to thereby appropriately heat food.

Furthermore, there are provided light 20 and camera 21 which is an image capturing unit provided on the same side surface as light 20, and a picture of food inside cooking cavity 11 is captured. Because camera 21 is arranged on the same side surface as light 20, the inside of cooking cavity 11 may be captured without being backlit. Door switch 22 for detecting opening/closing of door 3 is provided to housing 2, and protrusion 23 with which door switch 22 is to be pushed in is provided to door 3.

Figure 3:
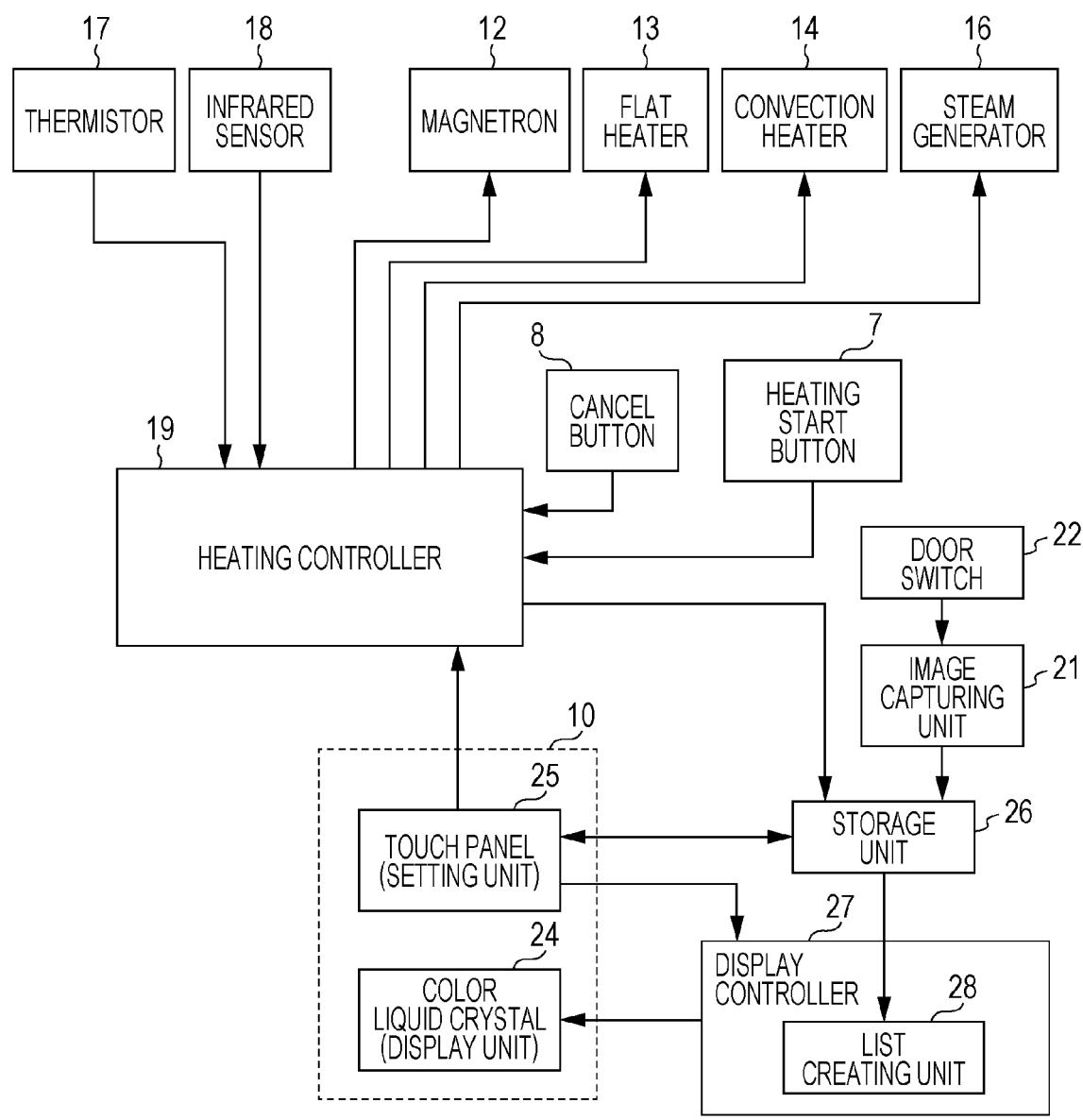
FIG. 3 is a control block diagram of the device for cooking by heating according to the first exemplary embodiment of the present invention.

Next, control of operation display unit 6 and image capturing unit 21 will be described with reference to the control block diagram in FIG. 3. Liquid crystal touch panel 10 includes a display unit configured as color liquid crystal display 24, and a setting unit configured as touch panel 25.

A user sets a heating control content by touch panel 25, which is the setting unit, and presses heating start button 7 to thereby cause heating controller 19 to perform heating by controlling magnetron 12, flat heater 13, convection heater 14, or steam generator 16, which is the heating unit, according to the set heating control content and according to inputs of thermistor 17 and infrared sensor 18.

When the user opens door 3 of cooking cavity 11, places food inside, and closes door 3, image capturing unit 21 captures a still image of the inside of cooking cavity 11 upon detection of closing of door 3 by door switch 22. Then, the user sets a heating control content by setting unit 25 and presses heating start button 7, and heating controller 19 starts heating. Then, when heating with the heating control content set by the user is completed, storage unit 26 stores the captured image and the heating control content set by setting unit 25 in association with each other as a correspondence table.

Additionally, the user may stop heating before it is completed by pressing cancel button 8 after heating is started. This is an operation for stopping in a case, for example, where a wrong heating control content is set and this is noticed before the heating is completed. In this case, the heating with the set heating control content is not completed, and storage unit 26 does not store the correspondence table.

Display controller 27 is for controlling display by, for example, creating a screen to be displayed by color liquid crystal display 24, which is the display unit. Display controller 27 includes a list creating unit 28. When the user performs an operation for displaying a list of records by touch panel 25, which is the setting unit, list creating unit 28 creates a screen displaying the list from images stored in the storage unit, and displays the screen on color liquid crystal display 24. Then, when the user selects one of the images displayed in the list, display controller 27 displays the heating control content stored in association with the selected image in storage unit 26 on color liquid crystal display 24. When the user confirmed the heating control content displayed on color liquid crystal display 24 and presses heating start button 7, heating controller 19 performs heating control according to the heating control content.

At the time of displaying a list of images, display controller 27 may simultaneously display texts, signs or the like indicating the heating control contents associated with the images.

Figure 4:
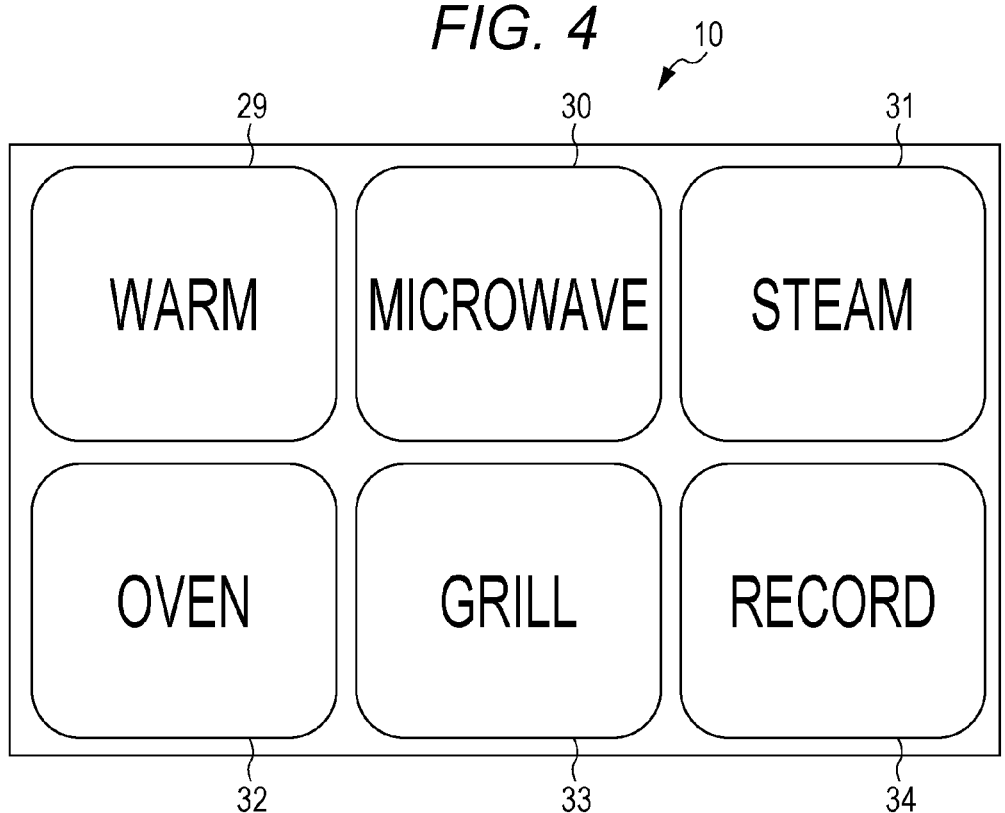
FIG. 4 is a diagram showing a heating menu selection screen on a liquid crystal touch panel of the device for cooking by heating according to the first exemplary embodiment of the present invention.

Next, a flow of an operation will be described with reference to a diagram of display on liquid crystal touch panel 10. FIG. 4 is a basic menu screen, and is a screen that is displayed first after application of power, for example. The basic menu screen displays warm button 29, microwave button 30, steam button 31, oven button 32, grill button 33, and record button 34.

At the time of use, a user opens door 3 of microwave oven 1, places food inside, and closes door 3. At this time, closing of the door is perceived by door switch 22, and the inside of the cavity is captured by camera 21 as a still image.

The user specifies a heating control content by pressing one of the buttons in FIG. 4. For example, in the case of placing, and heating, a bowl of cold rice in cooking cavity 11 of microwave oven 1, the user presses warm button 29 in FIG. 4. At this time, the screen of the liquid crystal touch panel is switched to a screen for setting a finishing temperature.

Figure 5:
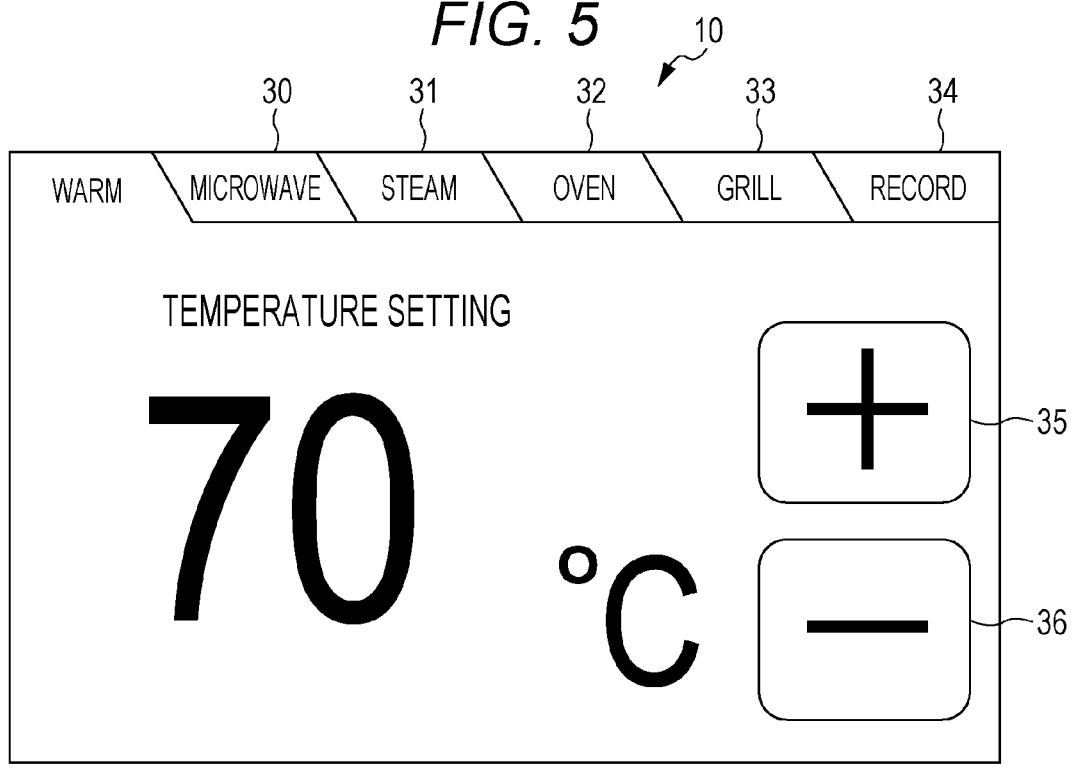
FIG. 5 is a diagram showing a temperature setting screen for warming on the liquid crystal touch panel of the device for cooking by heating according to the first exemplary embodiment of the present invention.

FIG. 5 shows an example of a temperature setting screen for warming. A set temperature is displayed at the center of the screen, and plus button 35 for raising the set temperature, and minus button 36 for lowering the set temperature are provided on the right side of the set temperature. The set temperature may be set between 40° C. and 90° C. in steps of 5° C., for example, and a user sets the temperature by operating plus button 35 and minus button 36 while looking at the set temperature on the screen. When a desired temperature (for example, 70° C.) is set, heating start button 7 is pressed and heating is started.

Then, heating controller 19 drives magnetron 12 and performs heating until the food, i.e. cold rice, reaches 70° C., while monitoring output detected by infrared sensor 18, and ends heating when it is detected that 70° C. is reached. At this time, storage unit 26 stores a still image, stored in advance, of cold rice captured at the time of closing of the door and "warm, 70° C." set by the user in association with each other.

In FIG. 5, microwave button 30, steam button 31, oven button 32, grill button 33, and record button 34 having the same functions as those in FIG. 4 are provided as tab buttons at upper portion, and changing to another heating control content may be performed on this screen.

Next, a case of heating frozen Chinese dumplings will be described as an example. In the case of heating frozen food sold on the market, it is recommended that heating be performed according to the setting shown on the wrapper, rather than performing heating using a sensor provided to the microwave oven. A user places Chinese dumplings on a dish and covers the dish with a plastic wrap, places the dish on which the Chinese dumplings are placed in cooking cavity 11, closes door 3, and performs detailed setting by pressing microwave button 30 in FIG. 4.

FIG. 6 shows an example of a screen for setting microwave heating power. The microwave heating power setting screen includes, as buttons used for selecting wattage, 800 W button 37, 600 W button 38, 500 W button 39, 400 W button 40, 300 W button 41, and 150 W button 42. A user may select heating power by pressing one of the buttons. For example, after 500 W button 39 is pressed, heating time is to be set on the next screen shown in FIG. 7.

FIG. 7 shows an example of a screen for setting microwave heating time. The microwave heating time setting screen includes min button 43 and sec button 44, and time is set by performing addition in steps of 1 minute from 0 to 9 by the pressing of the min button, and after 9, 0 is reached again. Also, time is set by performing addition in steps of 10 seconds from 0 to 50 by the pressing of the sec button, and after 50, 0 is reached again. For example, time is set to 2 minutes and 30 seconds in this manner. Then, the user presses heating start button 7 to start heating.

Then, heating controller 19 performs heating by driving magnetron 12 at 500 W for 2 minutes and 30 seconds, and then ends heating. At this time, storage unit 26 stores a still image, stored in advance, of the Chinese dumplings captured at the time of closing of the door and "microwave, 500 W, 2 min 30 sec" set by the user in association with each other.

Next, a case of baking cookies will be described as an example. Usually, after the dough is prepared, cookies are baked using an oven. There are a method for preheating cooking cavity 11 and then placing the dough inside and baking the same and a method for baking without preheating. In the description herein, the method for baking without preheating will be described. After preparing dough for cookies, the user places the pieces of dough on an oven dish, sets the oven dish inside cooking cavity 11, closes door 3, and performs detailed setting by pressing oven button 32 in FIG. 4.

Figure 8:
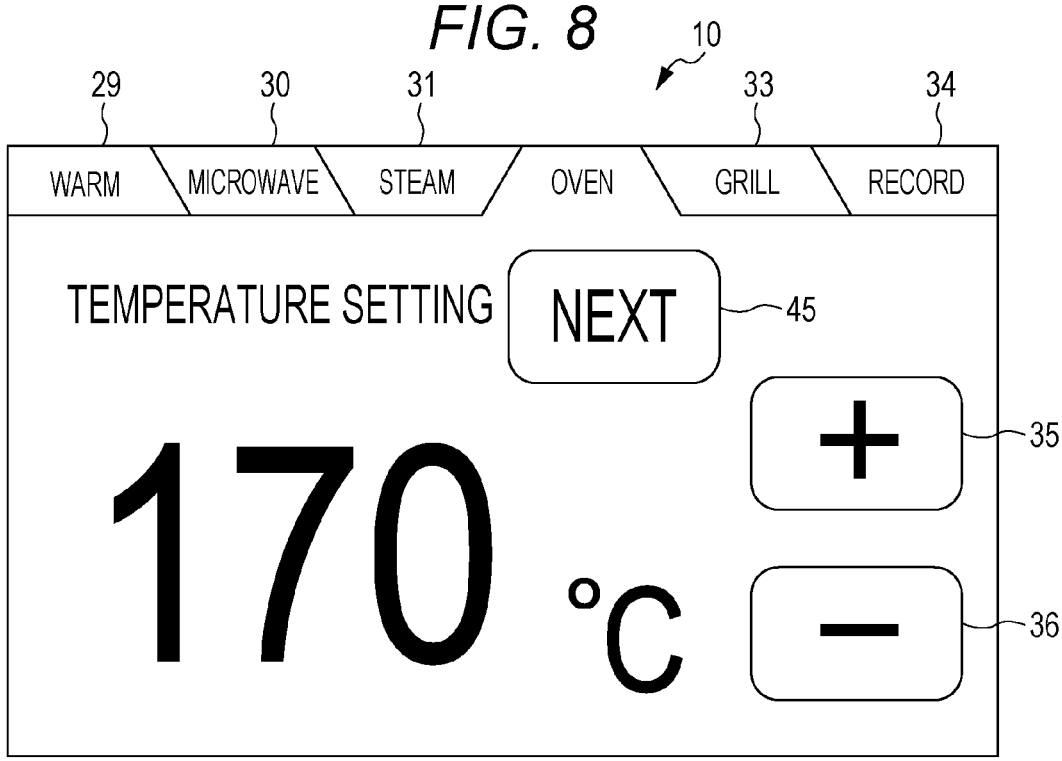
FIG. 8 is a diagram showing an oven temperature setting screen on the liquid crystal touch panel of the device for cooking by heating according to the first exemplary embodiment of the present invention.

FIG. 8 shows an example of a screen for setting an oven temperature. A set temperature is displayed at the center of the screen, and plus button 35 for raising the set temperature, and minus button 36 for lowering the set temperature are provided on the right side of the set temperature. The set temperature may be set between 150° C. and 250° C. in steps of 10° C., for example, and a user sets the temperature by operating plus button 35 and minus button 36 while looking at the set temperature on the screen. As shown in FIG. 8, when 170° C. is set, for example, transition to a screen for setting the heating time takes place by the pressing of next button 45.

Figure 9:
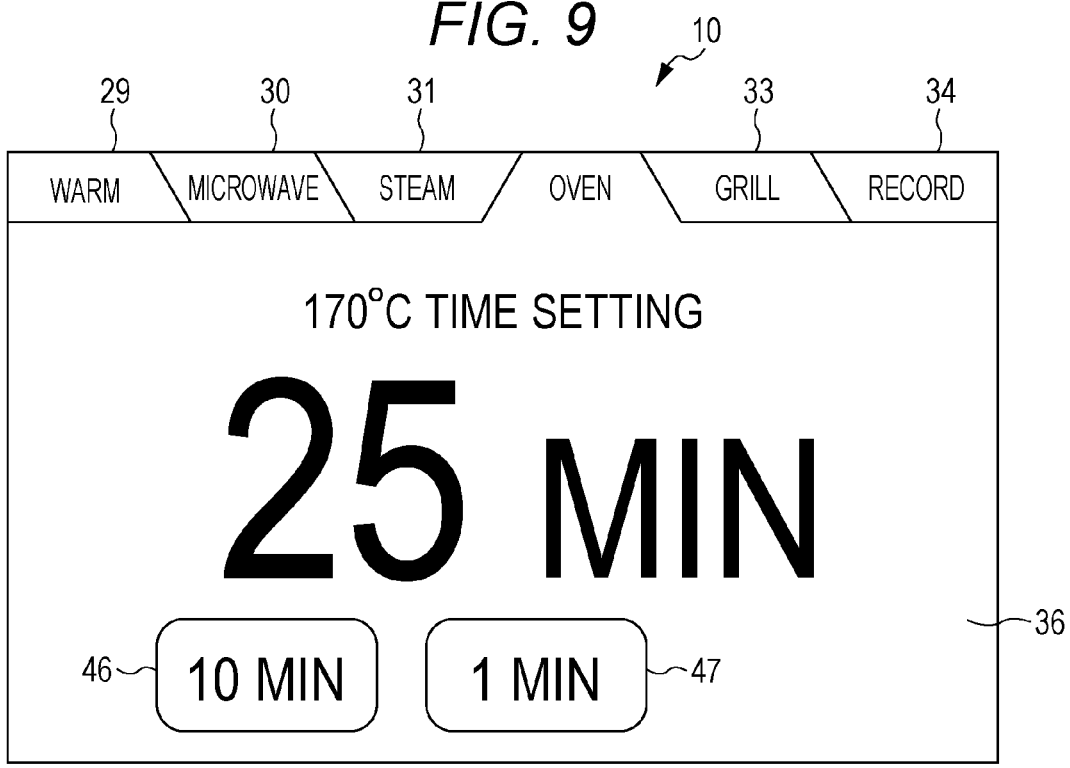
FIG. 9 is a diagram showing an oven heating time setting screen on the liquid crystal touch panel of the device for cooking by heating according to the first exemplary embodiment of the present invention.

FIG. 9 shows an example of a screen for setting the oven heating time. The oven heating time setting screen includes 10 min button 46 and 1 min button 47, and time is set by performing addition in steps of 10 minutes from 0 to 90 by the pressing of the 10 min button, and after 90, 0 is reached again. Time is also set by performing addition in steps of 1 minute from 0 to 9 by the pressing of the 1 min button, and after 9, 0 is reached again. In this manner, as shown in FIG. 9, time is set to 25 minutes, for example. Then, the user presses heating start button 7 to start heating.

Then, heating controller 19 drives circulating fan 15 and heats the inside of cooking cavity 11 by convection heater 14, and performs heating for 25 minutes while performing on-off control of convection heater 14 so that the temperature detected by thermistor 17 stays at 170° C., and then ends heating. At this time, storage unit 26 stores a still image, captured in advance, of cookie dough captured at the time of closing of the door and "oven, 170° C., 25 min" set by the user in association with each other.

Moreover, when steam button 31 in FIG. 4 is pressed, the heating time for steam heating is set, and when grill button 33 is pressed, two-sided grilling/one-sided grilling and the heating time are set, and in either case, storage unit 26 stores, at the time of start of heating, a still image of the inside of cooking cavity 11 captured at the time of closing of the door and the setting content set by the user in association with each other.

Figure 10:
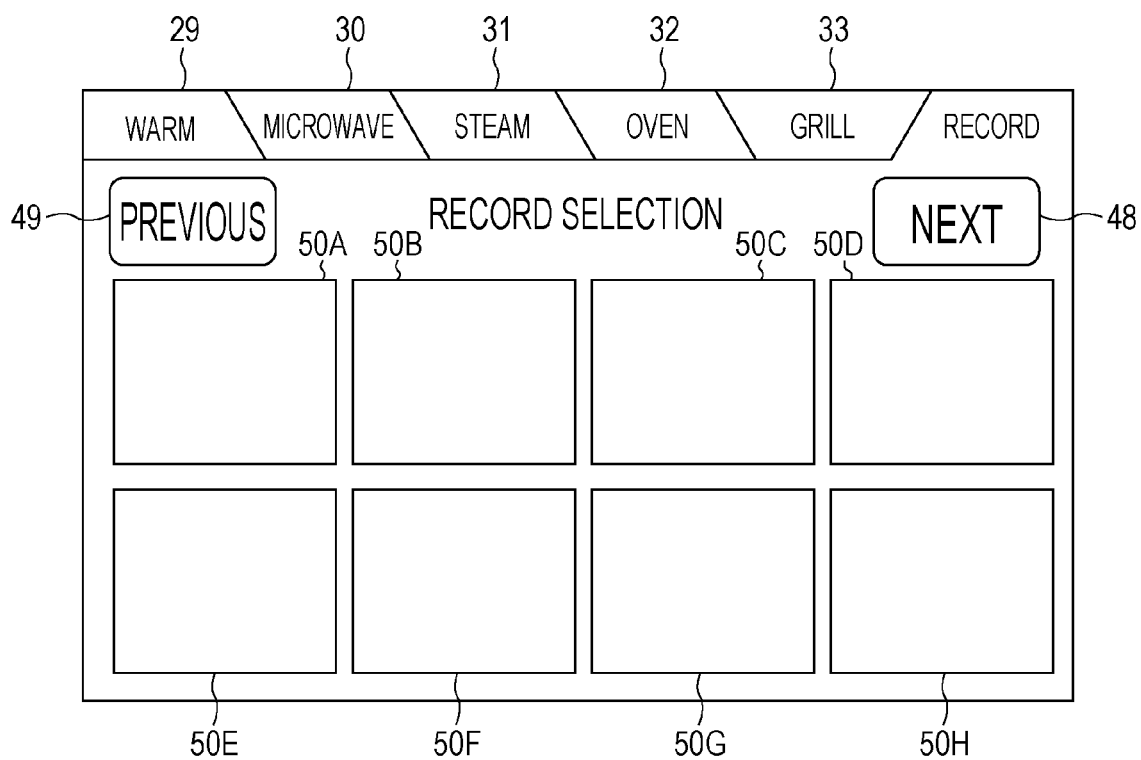
FIG. 10 is a diagram showing a screen for selecting from records on the liquid crystal touch panel of the device for cooking by heating according to the first exemplary embodiment of the present invention.

A screen after transition which is reached when record button 34 is pressed in FIG. 4 is shown in FIG. 10. In FIG. 10, photograph buttons 50A to 50H are still images of food that are captured by camera 21 when food is placed inside cooking cavity 11 by a user and door 3 is closed. Photograph buttons 50A to 50H are arranged in the order of capturing, and the latest is photograph button 50A, and the arrangement starts from the latest, followed by photograph button 50B, photograph button 50C, . . . , photograph button 50H in this order. This screen is created by list creating unit 28 in FIG. 3, and list creating unit 28 creates the screen by arranging the still images stored in storage unit 26.

Furthermore, pieces of heating information such as "warm, 70° C." and "microwave, 500 W, 2 min 30 sec" that are stored in association with the images are displayed at the lower parts of photograph buttons 50A to 50H. Parts of "warm", "microwave" and the like may be symbols such as icons which allow easy grasping of the heating methods, instead of texts.

Moreover, next button 48 is a button to be pressed in order to display a still image which is older than those displayed on the screen, and previous button 49 is a button to be pressed in order to display a still image which is newer than those displayed on the screen. If there are no more older still images, next button 48 is not displayed, and if there are no more newer still images, previous button 49 is not displayed.

In FIG. 10, for example, a still image of pieces of cookie dough placed on an oven dish is displayed on photograph button 50A, a still image of frozen Chinese dumplings placed on a dish is displayed on photograph button 50B, and a still image of a bowl of cold rice is displayed on photograph button 50C.

Storage unit 26 stores, in association with each other, the still image of cookies and "oven, 170° C., 25 min", the still image of frozen Chinese dumplings and "microwave, 500 W, 2 min 30 sec", and the still image of cold rice and "warm, 70° C.". Thus, when a user selects photograph button 50A, for example, transition to the screen shown in FIG. 9 where "oven, 170° C., 25 min" is set takes place.

If there is no problem with the setting, the user presses heating start button 7 so that heating controller 19 drives circulating fan 15 and heats the inside of cooking cavity 11 by convection heater 14, and heats the food in cooking cavity 11 for 25 minutes while performing on-off control of convection heater 14 so that the temperature detected by thermistor 17 stays at 170° C.

In the same manner, when the user selects photograph button 50B, transition to the screen shown in FIG. 7 where "microwave, 500 W, 2 min 30 sec" is set takes place. If there is no problem with the setting, the user presses heating start button 7 so that heating controller 19 drives magnetron 12 at 500 W for 2 minutes and 30 seconds, and heats the food inside cooking cavity 11.

Furthermore, when the user selects photograph button 50C, transition to the screen shown in FIG. 5 where "warm, 70° C." is set takes place. If there is no problem with the setting, the user presses heating start button 7 so that heating controller 19 drives magnetron 12 and heats the food inside cooking cavity 11 until the food, i.e. cold rice, reaches 70° C., while monitoring the output detected by infrared sensor 18.

Figure 11:
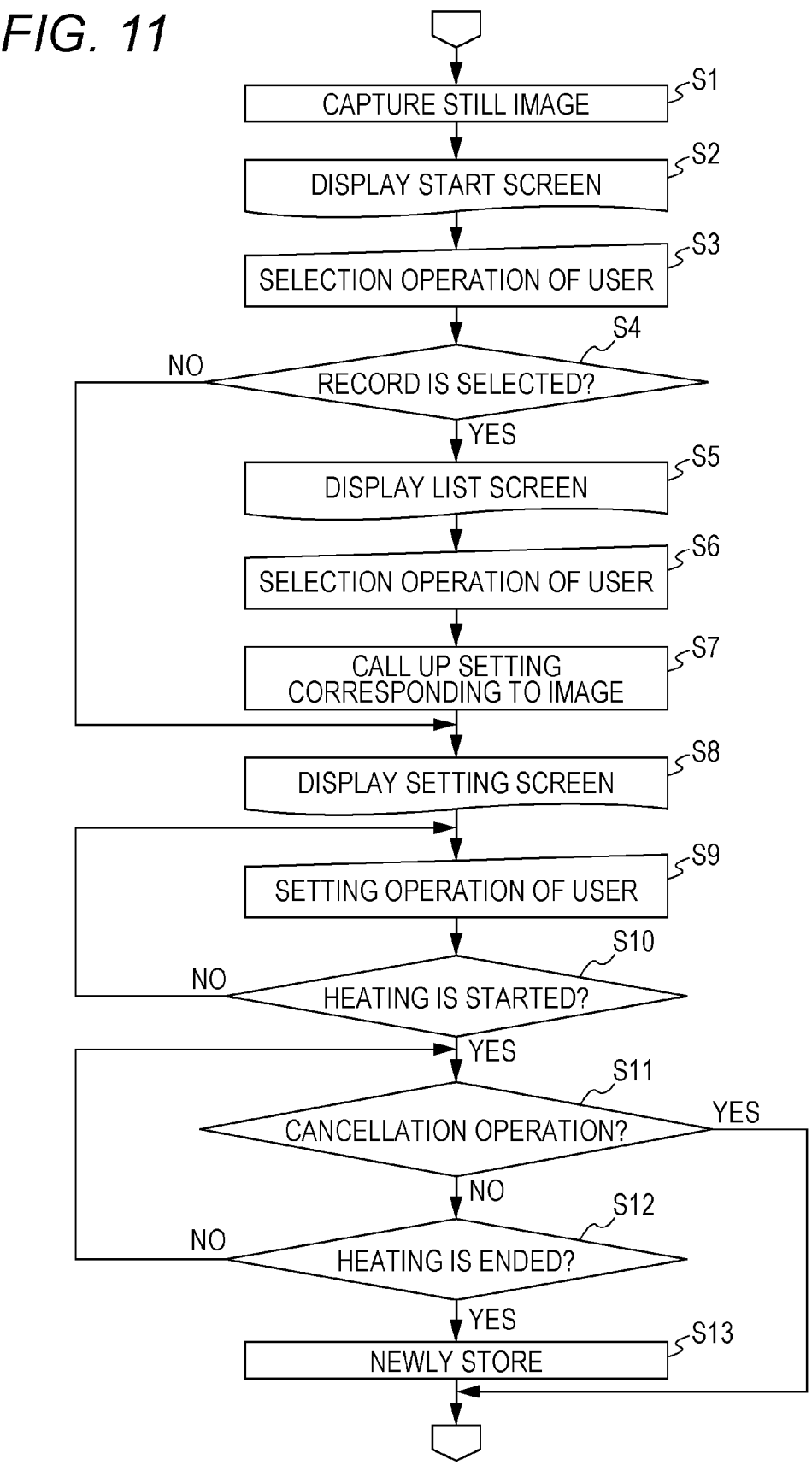
FIG. 11 is a flow chart showing a flow of an operation of the device for cooking by heating according to the first exemplary embodiment of the present invention.

Next, a flow of an overall operation will be described with reference to the flow chart in FIG. 11. Here, the flow of operation following detection of closing of door 3 by door switch 22 after door 3 was opened and food was placed in cooking cavity 11 will be described.

First, when closing of door 3 is detected by door switch 22, a still image at this time is captured by camera 21 in step S1. Then, display controller 27 displays a start screen shown in FIG. 4 on color liquid crystal display 24 in step S2, and in step S3, a selection operation of the user is awaited. If the user selects record button 34 in step S4, the process proceeds to step S5, and if a button other than record button 34 is selected, the process proceeds to step S8.

In step S5, list creating unit 28 creates the screen shown in FIG. 10 and displays the screen on color liquid crystal display 24, and in step S6, a selection operation of the user is awaited. If the user selects one of photograph buttons 50A to 50H on the screen shown in FIG. 10, display controller 27 calls up the heating control content that is stored in storage unit 26 in association with the selected image in step S7, and the process proceeds to step S8.

In step S8, if the process is from step S4, that is, if a button other than record button 34 is selected, display controller 27 displays, on color liquid crystal display 24, the screen which is shown in FIG. 5, 6, 8 or the like and which is according to the heating function selected by the user in step S4. Also, if the process is from step S7, that is, if record button 34 is selected, display controller 27 displays, on color liquid crystal display 24, the screen which is shown in FIG. 5, 6, 8 or the like and which is according to the heating control content that is associated with the image shown in photograph button 50A, . . . , 50H. Then, an operation of the user is awaited in step S9, and in step S10, pressing of heating start button 7 by the user is awaited. When heating start button 7 is pressed in step S10, the process proceeds to step S11.

In step S11, whether cancel button 8 is pressed by the user is checked until end of heating is determined in step S12. If cancel button 8 is pressed, heating is stopped, and the process is ended. In addition, if heating is ended without pressing of cancel button 8, that is, due to a lapse of time on a timer or due to a predetermined temperature being reached according to infrared sensor 18, for example, the process proceeds to step S13. In step S13, because heating is completed according to the control content set in step S9, the still image captured in step S1 and the heating control content determined in step S9 are newly stored in storage unit 26 in association with each other. When step S13 is completed, the process is ended.

Now, the reason why a correspondence between a still image and a heating control content is not stored when cancel button 8 is pressed during heating is that, if heating is cancelled by the user during heating, the set heating control content is highly likely to be wrong. If a wrong correspondence is stored and displayed in the list in FIG. 10, this is troublesome to the user. Thus, if a cancellation operation is performed before the heating is completed by cancel button 8, the image is not stored.

Additionally, chronological display in the order of capturing is described in relation to display of a list of records, but the present invention is not limited to such display, and for example, display may be performed in order from an image that is most frequently used, and the usability for the user may thereby be improved.

Second Exemplary Embodiment

Figure 12:
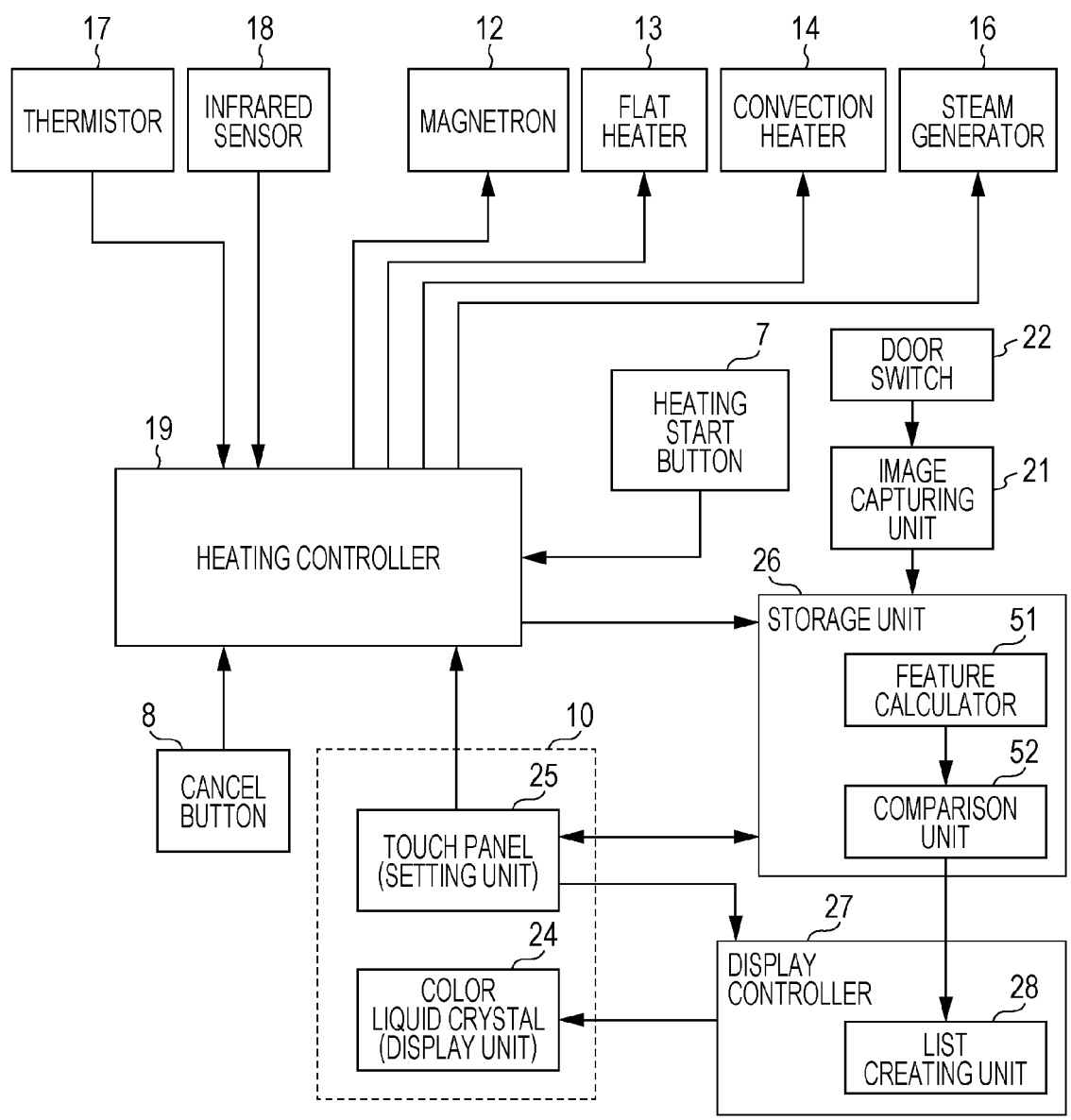
FIG. 12 is a control block diagram of a device for cooking by heating according to a second exemplary embodiment of the present invention.

Next, a second exemplary embodiment of the present invention will be described. FIG. 12 is a control block diagram showing the second exemplary embodiment. In FIG. 12, functional parts the same as those in FIG. 3, which is the control block diagram according to the first exemplary embodiment, are denoted with the same numerals, and description thereof is omitted. FIG. 12 is different from FIG. 3 in that storage unit 26 includes feature calculator 51 and comparison unit 52. Because feature calculator 51 and comparison unit 52 are provided, only images that are similar to a captured image, instead of all the records, are displayed as a list.

To this end, feature calculator 51 calculates a feature of a captured still image, and stores the feature together with the still image. An example of a calculation method of the feature will be described later. Comparison unit 52 compares the features of captured still images with the feature of a stored image, calculates the similarities of how similar the features are, and extracts only those that are similar enough to reach a predetermined degree or higher. Then, list creating unit 28 creates a list of only the images that are similar enough to reach a predetermined degree or higher extracted by comparison unit 52.

Next, a method for calculating the feature from a still image will be described. For example, camera 21 takes a group of horizontally 640 dots and vertically 480 dots as a captured still image, and records the color of each dot. Then, the brightness of each of three color components, red, green, and blue, of each dot is recorded using one byte, ranging from 0 to 255, and the color of one dot is recorded by using three bytes.

Now, focusing on red, which is one color component, the frequency of occurrence is counted for each of brightnesses between 0 and 255 of red (generally referred to as a histogram). That is, each of 640×480 dots has a value between 0 to 255 with respect to red, and a histogram obtained by counting the number of dots for each of depths 0 to 255 is taken as the feature of red. The histogram of green and the histogram of blue are also taken as features in the same manner, and the three histograms are calculated and recorded as the features.

Figure 13:
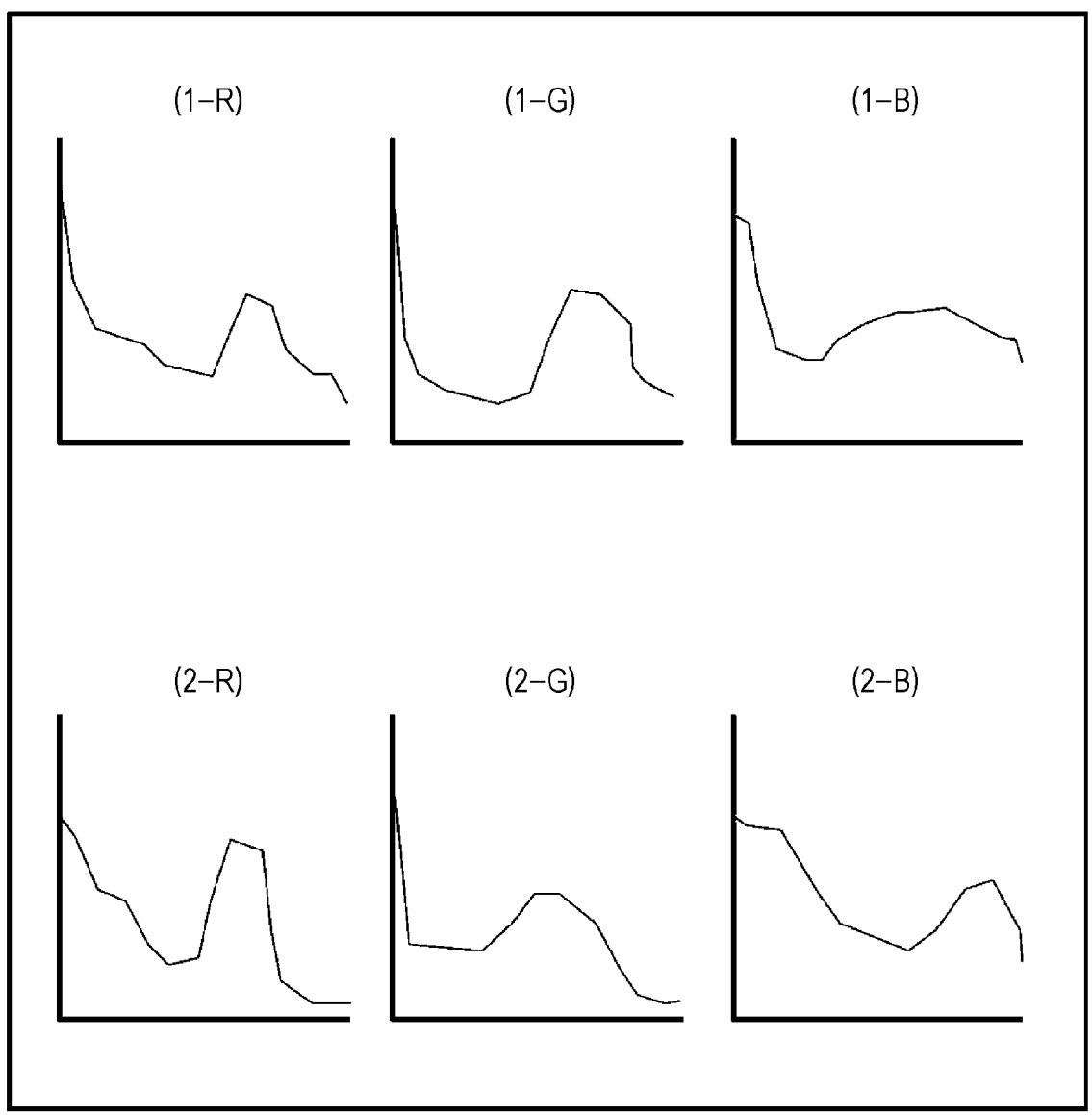
FIG. 13 is a diagram describing features of pieces of image information of the device for cooking by heating according to the second exemplary embodiment of the present invention.

Next, histograms, which are the features, and the similarity between images will be described with reference to FIGS. 13 and 14. FIG. 13 is a diagram for describing the histograms described above. Assuming that there are two images, (1-R) is the histogram of the red component of a first image, (1-G) is the histogram of the green component of the first image, and (1-B) is the histogram of the blue component of the first image. The horizontal axes indicate the brightness, and of the integers from 0 to 255, 0 is the darkest, and 255 is the brightest. In addition, the vertical axes indicate the frequency of occurrence. In the same manner, (2-R) is the histogram of the red component of a second image, (2-G) is the histogram of the green component of the second image, and (2-B) is the histogram of the blue component of the second image. In this manner, one image may be expressed by the histograms of red, green, and blue as the features.

Figure 14:
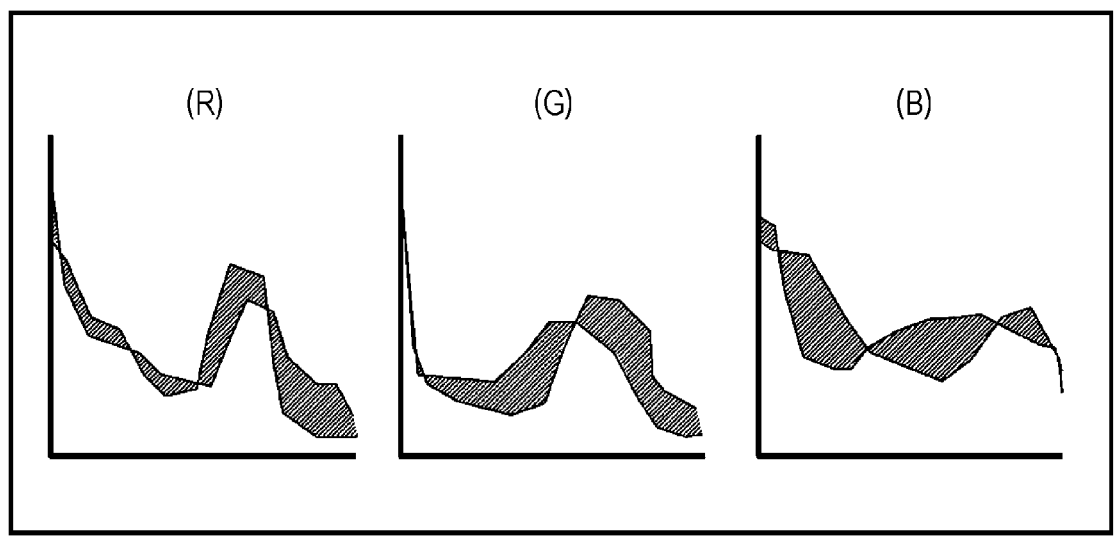
FIG. 14 is a diagram describing similarities between features of pieces of image information of the device for cooking by heating according to the second exemplary embodiment of the present invention.

FIG. 14 is a diagram describing the similarity between two images, and the histograms in FIG. 13 are overlapped with each other. That is, (R) is obtained by overlapping the histograms, of the red component, of the first image (FIG. 13, (1-R)) and the second image (FIG. 13, (2-R)). In addition, (G) is obtained by overlapping the histograms, of the green component, of the first image (FIG. 13, (1-G)) and the second image (FIG. 13, (2-G)). Furthermore, (B) is obtained by overlapping the histograms, of the blue component, of the first image (FIG. 13, (1-B)) and the second image (FIG. 13, (2-B)).

Parts shaded with diagonal lines indicate the shifted portions of the histograms of the two images. The sum of the areas of the shifted portions represents the similarity, and the sum of the areas is larger for images that are not similar and is smaller for images that are similar. If two images that are the same are used, the histograms will be completely the same and will include no shifted portions, and thus, the sum of the areas will be zero.

Because the similarity between two images may be quantitatively evaluated in the above manner, it is possible to check, by using histograms of a plurality of stored images, to what degree one new image is similar to the stored images, and only the image that is similar enough to reach a predetermined degree or higher may be extracted.

Figure 15:
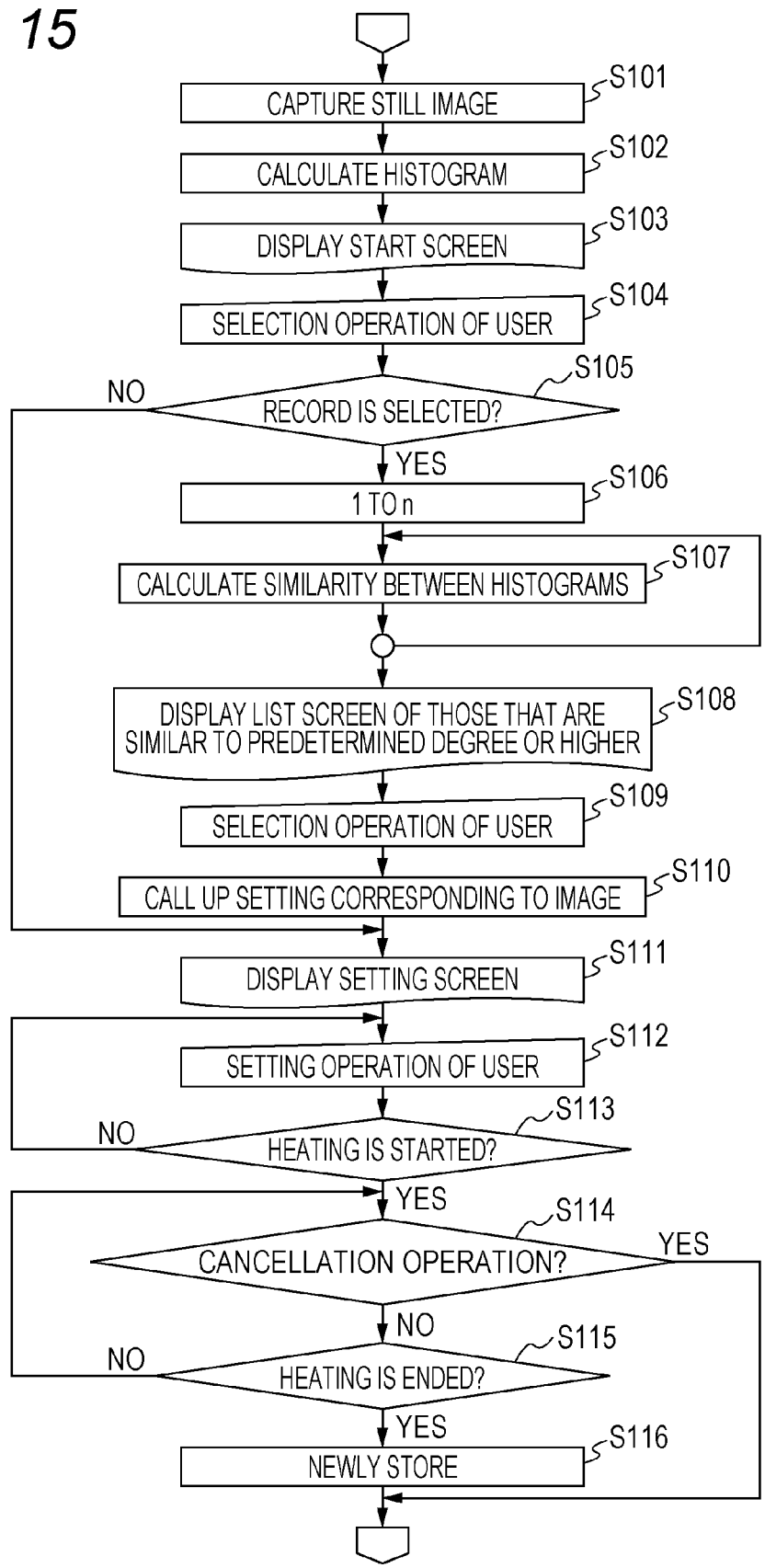
FIG. 15 is a flow chart showing a flow of an operation of the device for cooking by heating according to the second exemplary embodiment of the present invention.

Next, a flow of an overall operation of the second exemplary embodiment will be described with reference to the flow chart in FIG. 15. As in the case of FIG. 11, the flow of operation following detection of closing of door 3 by door switch 22 after door 3 was opened and food was placed in cooking cavity 11 will be described.

First, when closing of door 3 is detected by door switch 22, a still image at this time is captured by camera 21 in step S101. Then, in step S102, feature calculator 51 calculates the histograms of the captured still image. Next, display controller 27 displays a start screen shown in FIG. 4 on color liquid crystal display 24 in step S103, and in step S104, a selection operation of the user is awaited. If the user selects record button 34 in step S105, the process proceeds to step S106, and if a button other than record button 34 is selected, the process proceeds to step S111.

In steps S106 and S107, comparison unit 52 reads the histograms of all the stored images (indicated by (1 to n)), and calculates, as the similarities, the sums of the areas of the shifted portions of all the histograms which have been read with respect to the histograms calculated in step S102. Then, only the images for which the calculated areas are equal to or smaller than a predetermined area are extracted and are used in step S108 by list creating unit 28 to create the screen shown in FIG. 10, and are displayed on color liquid crystal display 24, as images that are similar to reach a predetermined degree or higher. Then, in step S109, a selection operation of the user is awaited. If the user selects one of photograph buttons 50A to 50H on the screen shown in FIG. 10, display controller 27 calls up the heating control content that is stored in association with the selected image in storage unit 26 in step S110, and the process proceeds to step S111.

In step S111, if the process is from step S105, that is, if a button other than record button 34 is selected, display controller 27 displays, on color liquid crystal display 24, the screen which is shown in FIG. 5, 6, 8 or the like and which is according to the heating function selected by the user in step S105. Also, if the process is from step S110, that is, if record button 34 is selected, display controller 27 displays, on color liquid crystal display 24, the screen which is shown in FIG. 5, 6, 8 or the like and which is according to the heating control content that is associated with the image shown in photograph button 50A, . . . , 50H. Then, an operation of the user is awaited in step S, and in step S113, pressing of heating start button 7 by the user is awaited. When heating start button 7 is pressed in step S113, the process proceeds to step S114.

In step S114, whether cancel button 8 is pressed or not by the user is checked until end of heating is determined in step S115. If cancel button 8 is pressed, heating is stopped, and the process is ended. On the other hand, if heating is ended without pressing of cancel button 8, that is, due to a lapse of time on a timer or due to a predetermined temperature being reached according to infrared sensor 18, for example, the process proceeds to step S116. In step S116, the still image captured in step S101, the histograms calculated in step S102, and the heating control content determined in step S112 are newly stored in storage unit 26 in association with one another. When step S116 is completed, the process is ended.

As described above, according to the second exemplary embodiment, a list of records is displayed after being narrowed down to similar images. Thus, because only the images of records which are highly likely to be selected are displayed, selection is facilitated.

Additionally, in the list display, display may be performed in the order from the most similar image, that is, in the order from the smallest sum of shifted areas of the histograms, and this may further improve the usability for the user.

Additionally, the method for calculating the similarity is not limited to the method described in the present application, and it is also possible to use a method for calculating, as the similarity, a three-dimensional Euclidean distance by using respective average values of the brightnesses of red, green, and blue as features, or a method for calculating, as the similarity, the correlation coefficient by using the brightnesses of red, green, and blue of each dot as features, for example.

As described above, the present invention includes the heating unit for heating food that is accommodated in the cooking cavity, the setting unit for setting a heating control content of the heating unit, the display unit for displaying the heating control content set by the setting unit, and the display controller for controlling display on the display unit. There are also included the image capturing unit for capturing the inside of the cooking cavity, and the storage unit for storing an image captured by the image capturing unit and the heating control content set by the setting unit as a correspondence table in association with each other. Furthermore, the display controller controls display so as to display the images stored in the storage unit in a list on the display unit, and the setting unit sets, based on selection of an image from the list, an associated heating control content in the correspondence table in the storage unit.

According to this configuration, when a user selects an image from the list, the setting unit sets the heating control content that is associated with the selected image in the correspondence table. Thus, burdensome setting operation becomes unnecessary when heating with a heating control content that is the same as the setting performed in the past. In addition, the user is allowed to select a heating control content stored in the storage unit by image, and heating control content may be surely selected, and the usability is improved.

In addition, according to the present invention, the storage unit stores the image captured by the image capturing unit and the heating control content in the correspondence table in association with each other, in a case where heating with the heating control content set by the setting unit is completed.

According to this configuration, if heating is stopped before it is completed, such as in a case where the user sets a wrong heating control content and cancels the heating before it is completed, an image and the heating control content are not stored in association with each other in the correspondence table. Accordingly, only the reliable heating control content by which heating was performed until the end is stored in the correspondence table in association with an image, and heating control content may be surely selected, and thus, the usability is improved.

Furthermore, according to the present invention, the display controller performs control so that an image is displayed in the list, and a heating control content that is stored in the correspondence table in association with the image is also displayed.

According to this configuration, the heating control content is displayed together with the image, and thus, the user may easily check and surely select the heating control content, and the usability is improved.

Furthermore, according to the present invention, there are included a feature calculator for calculating a feature from an image captured by the image capturing unit, and a comparison unit for comparing the feature of the image captured by the image capturing unit and a feature of an image that is stored in the storage unit, and determining a similarity between the images, where the display controller extracts an image that is similar enough to reach a predetermined degree or higher according to the comparison unit from the storage unit, and displays the image in the list.

According to this configuration, the feature calculator calculates the feature of the image captured by the image capturing unit and the feature of each image that is stored in the storage unit, and the comparison unit determines the similarity between the feature of the image captured by the image capturing unit and the feature of each image that is stored in the storage unit, and the display controller displays only the image that is similar enough to reach a predetermined degree or higher in the list. Accordingly, even if a large number of heating control contents are stored, only the minimum number of candidates which will possibly be selected by the user are displayed, and the user may surely select a heating control content, and the usability is improved.

INDUSTRIAL APPLICABILITY

As described above, according to the present invention, a user may select an image of heating/cooking performed in the past to thereby set the same heating control content as the past heating control content, and thus, the setting becomes less burdensome, and the present invention may be applied to general cooking appliances, such as rice cookers, IH cooking heaters and the like, in addition to the microwave ovens.

The invention claimed is:

1. A device for cooking by heating comprising:
   a heating unit for heating a food item that is accommodated in a cooking cavity;
   a setting unit configured to set a heating control content of the heating unit;
   a display unit configured to display the heating control content set by the setting unit;
   a display controller configured to control display on the display unit;
   an image capturing unit configured to capture an image of the food item; and
   a storage unit configured to store the image of the food item captured by the image capturing unit when the food item is accommodated in the cooking cavity, and the heating control content set by the setting unit as a correspondence table in association with each other, wherein:
   the correspondence table stored in the storage unit includes a plurality of images of food items captured by the image capturing unit when the food items are each accommodated in the cooking cavity, each of the plurality of images of food items being associated with a corresponding one of heating control contents used in cooking for the food items set by the setting unit,
   the display controller is configured to control display so as to display the plurality of images stored in the correspondence table stored in the storage unit in a list on the display unit,
   the display controller is further configured to display, when an image of the plurality of images is selected from the list, a screen which is according to the corresponding one of the heating control contents associated with the selected image stored in the correspondence table in the storage unit, and
   the storage unit is further configured to:
      (i) store the image captured by the image capturing unit and the heating control content in the correspondence table in association with each other, in a case where heating with the heating control content set by the setting unit is completed, and
      (ii) stop storing the image captured by the image capturing unit and the heating control content in the correspondence table in association with each other, in a case where the heating with the heating control content set by the setting unit is stopped by a user prior to completion of the heating.

2. The device for cooking by heating according to claim 1, wherein the display controller is configured to perform control so that, when the plurality of images is displayed in the list on the display unit, heating control contents stored in the correspondence table are also displayed on the display unit in a correspondence manner.

3. The device for cooking by heating according to claim 1, further comprising:
   a feature calculator configured to calculate a feature from the image captured by the image capturing unit; and
   a comparison unit configured to compare the feature of the image captured by the image capturing unit and a feature of an image that has already been stored in the storage unit, and determine a similarity between the images,
   wherein the display controller is configured to extract images that are similar enough to reach a predetermined degree or higher according to the comparison unit from the storage unit, and displays the images in the list on the display unit.

4. A control method for a device for cooking by heating, the method comprising:
   a first setting step of receiving heating cooking setting by a user for a food item that is accommodated in a cooking cavity;
   an image capturing step of capturing an image of the food item;
   a cooking step of performing cooking of the food item using the heating control content as a result of confirmation of the heating control content;
   a storing step of:
      (i) storing the heating control content used in the cooking of the food item and the image of the food item captured when the food item is accommodated in the cooking cavity, in association with each other, as a result of completion of the heating, and
      (ii) stop storing the heating control content and the image of the food item captured when the food item is accommodated in the cooking cavity, in association with each other, as a result of termination of the heating by the user prior to completion of the heating;
   a selecting step of displaying:
      (a) a plurality of images of food items which are captured in the image capturing step, as a result of a record search being selected in the first setting step, and
      (b) a screen, as a result of an image being selected from the plurality of images of food items, which is according to a heating control content associated with the selected image; and
   a second setting step of receiving an operation to start heating with the heating control content that is associated with the selected image.

5. The control method for the device for cooking by heating according to claim 4, wherein the heating control content that is associated with a displayed image is displayed in the selecting step.

6. The control method for the device for cooking by heating according to claim 4, the method further comprising:
   a feature calculating step of calculating a feature from the image captured in the image capturing step; and
   a comparing step of comparing the feature of an first image captured in the image capturing step and a feature of a second image that has already been stored in the storage step, and determining a similarity between the first image and the second image,
   wherein the second image that is similar enough to reach a predetermined degree or higher according to the comparing step is displayed in the selecting step.

7. The device for cooking by heating according to claim 1, wherein the heating control content comprises at least one selected from the group consisting of type of heating, heating power, heating time and heating temperature.

8. The control method for the device for cooking by heating according to claim 4, wherein the heating control content comprises at least one selected from the group consisting of type of heating, heating power, heating time and heating temperature.

* * * * *